United States Patent
Bui et al.

(10) Patent No.: US 12,360,743 B1
(45) Date of Patent: Jul. 15, 2025

(54) NEURAL NETWORK SYSTEMS FOR SOURCE CODE GENERATION AND RANKING

(71) Applicant: FPT USA Corp., Richardson, TX (US)

(72) Inventors: Quoc Nghi Duy Bui, Ho Chi Minh (VN); Hung Quoc To, Binh Thuan (VN); Minh Huynh Nguyen, Phu Yen (VN)

(73) Assignee: FPT USA Corp., Richardson, TX (US)

( * ) Notice: Subject to any disclaimer, the term of this patent is extended or adjusted under 35 U.S.C. 154(b) by 0 days.

(21) Appl. No.: 18/892,972

(22) Filed: Sep. 23, 2024

(51) Int. Cl.
*G06F 8/30* (2018.01)
*G06F 11/3668* (2025.01)

(52) U.S. Cl.
CPC .......... *G06F 8/30* (2013.01); *G06F 11/3684* (2013.01)

(58) Field of Classification Search
CPC .......... G06F 11/36–3696; G06F 8/30; G06F 11/3698; G06N 20/00–20; G06N 3/02–105
See application file for complete search history.

(56) References Cited

U.S. PATENT DOCUMENTS

| | | | |
|---|---|---|---|
| 10,983,760 B2 | 4/2021 | Guan | |
| 2023/0325154 A1 | 10/2023 | Arcadinho et al. | |
| 2024/0311582 A1* | 9/2024 | Schaefer | G06F 11/3608 |

OTHER PUBLICATIONS

To, H.Q., et al., "Neural Rankers for Code Generation via Inter-Cluster Modeling", ArXiv [online], Oct. 16, 2023 [retrieved Nov. 29, 2024], Retrieved from Internet: <URL: https://arxiv.org/pdf/2311.03366v1>, pp. 1-13.*
Bei Chen, Fengji Zhang, Anh Nguyen, Daoguang Zan, Zeqi Lin, Jian-Guang Lou, Weizhu Chen, Codet: Code generation with generated tests, Conference paper at ICLR 2023.
Yujia Li, David Choi, Junyoung Chung, Nate Kushman, Julian Schrittwieser, Rémi Leblond, Tom Eccles, James Keeling, Felix Gime, Competition-level code generation with alphacode.
Tianyi Zhang, Tao Yu, Tatsunori B. Hashimoto, Mike Lewis, Wen-Tau Yih, Daniel Fried, Sida I. Wang, Coder Reviewer Reranking for Code Generation, Nov. 29, 2022.

* cited by examiner

*Primary Examiner* — Todd Aguilera (57) ABSTRACT

A computer-implemented method for generating and ranking source code for performing a task is described. The method includes: receiving input data comprising a task description, a code generation prompt and a test case generation prompt; processing the input data using at least one trained code generation neural network to generate a plurality of code solutions and a plurality of test cases; for each code solution, executing the set of candidate source code on the test inputs of the plurality of test cases to generate a plurality of execution outputs; clustering the plurality of code solutions into a plurality of clusters; computing an interaction matrix that specifies functional overlap between the plurality of clusters; determining, for each cluster, a score based the interaction matrix; and ranking the plurality of clusters based on the scores of the plurality of clusters.

20 Claims, 6 Drawing Sheets

FIG. 1

Below is an instruction that describes a task. Write a response that appropriately completes the requests.

Instruction:
Create a Python script for this problem:
from typing import List, Tuple def sum_product(numbers: List[int]) -> Tuple[int, int]:
""" For a given list of integers, return a tuple consisting of a sum and a product of all the integers in a list. Empty sum should be equal to 0 and empty product should be equal to 1."""

Response:

FIG. 2

Below is an instruction that describes a task. Write a response that appropriately completes the request.

Instruction:
I have this function stub, please generate 50 test cases for this function. The function stub is as follow:
```python
from typing import List, Tuple def sum_product(numbers: List[int]) ->
        Tuple[int, int]:
    """ For a given list of integers,
    return a tuple consisting of a
    sum and a product of all the
    integers in a list. Empty sum
    should be equal to 0 and empty
    product should be equal to 1."""
    pass
```
- Each test case is in the form of assertion statement, for example:
assert sum_product(...) == ...
- Each test case is in a single line
- The length of each test case should not be too long, ideally less than or equal to 150 letters
- The test input should not be too long
- The inputs of test cases should be diverse and cover corner cases of the function
- Test cases should not be repeated

Response: Here are 50 test cases for function 'sum_product':
assert sum_product(

```
def f(n):
    """Implement the function f that takes n as a parameter, and returns a list
    of size n, such that the value of the element at index i is the factorial of i if i
    is even   or the sum of numbers from 1 to i otherwise. i starts from 1."""
```
— 502

```
                                                                        #3
result = []
for i in range(1, n + 1):
    if i % 2 == 0:
        result.append(i)
    else:
        result.append(sum(range(1, i +
1)))
return result
```
— 504

```
                                                                        #4
result = []
for i in range(1, n+1):
    if i % 2 == 0:
        result.append(i)
    else:
        temp = 0
        for j in range(1, i+1):
            temp += j
        result.append(temp)
return result
```
— 506

NEURAL NETWORK SYSTEMS FOR SOURCE CODE GENERATION AND RANKING

BACKGROUND

This disclosure generally relates to the field of code generation and ranking, specifically to neural network systems for source code generation and ranking.

Recent advancements in language models tailored for code generation have garnered significant interest, particularly with the advent of large-scale language models trained on extensive programming-related datasets. These models have demonstrated capabilities in generating code snippets and assisting in tasks ranging from autocompletion to full-fledged code generation. By leveraging vast volumes of pre-training data, these models can interpret natural language prompts and produce functional code across various programming languages. This development has the potential to streamline software development processes and make programming more accessible to non-expert users.

However, despite their utility, the code sequences generated by these models are often prone to errors, especially when likelihood-based decoding techniques, such as greedy search or beam search, are employed. Greedy search, which selects the most probable token at each step, and beam search, which expands multiple candidates and selects the highest probability sequence, can optimize for token likelihood but fail to capture deeper semantic correctness. As a result, the generated code may contain syntactical or logical flaws, including incorrect function calls, type mismatches, or missing context-specific constraints. Furthermore, even small variations in the input prompt can lead to significant discrepancies in the output, as the model lacks a deep understanding of the program's intended behavior. Thus, while large language models have made substantial progress in automating coding tasks, the outputs require thorough review and testing to ensure they meet the intended functionality.

SUMMARY

In general, one innovative aspect of the subject matter described in this specification can be embodied in a computer-implemented method for generating and ranking code solutions for performing a task. The method includes: receiving, by one or more processors, input data to at least one trained code generation neural network, wherein the input data comprises (i) a task description describing a task; (ii) a code generation prompt that instructs at least one trained code generation neural network to generate source code for performing the task, and (iii) a test case generation prompt that instructs the at least one trained code generation neural network to generate a set of test cases for testing the source code generated by the at least one trained code generation neural network; processing the input data using the at least one trained code generation neural network to generate (i) a plurality of code solutions, each of the plurality of code solutions comprising a respective set of candidate source code for performing the task, and (ii) a plurality of test cases for testing the plurality of code solutions, wherein each of the plurality of test cases comprises a test input and an expected output for the test input; for each of the plurality of code solutions: executing, by the one or more processors, the set of candidate source code in the code solution on the test inputs of the plurality of test cases to generate a plurality of execution outputs for the test inputs; clustering, by the one or more processors, the plurality of code solutions into a plurality of clusters based on the execution outputs of the plurality of code solutions; computing, by the one or more processors, an interaction matrix that specifies functional overlap between the plurality of clusters; determining, for each of the plurality of clusters, a score based the interaction matrix; and ranking the plurality of clusters based on the scores of the plurality of clusters.

In some implementations, clustering, by the one or more processors, the plurality of code solutions into the plurality of clusters based on the execution outputs of the plurality of code solutions includes: grouping code solutions that have identical execution outputs into a same cluster.

In some implementations, determining, for each of the plurality of clusters, a score based the interaction matrix includes: multiplying the interaction matrix by a validation score vector to obtain a ranking score vector that comprises a score for each of the plurality of clusters.

In some implementations, wherein the validation score vector represents, for each of the plurality of clusters, a feature of the cluster.

In some implementations, the feature is a number of code solutions in the cluster.

In some implementations, the feature is a number of test cases that the code solutions in the cluster have passed.

In some implementations, the interaction matrix is denoted as $I \in \mathbb{R}^{K \times K}$, where K is the number of clusters in the plurality of clusters, wherein each element in the interaction matrix is computed as follows:

$$I_{ij} = \frac{1}{M} \sum_{k=1}^{M} \delta(o_{ik} = o_{jk}),$$

where $I_{ij}$ represents functional overlap between cluster $C_i$ and cluster $C_j$, $o_{ik}$ and $o_{jk}$ are execution outputs of cluster $C_i$ and cluster $C_j$ respectively on the $k^{th}$ test input. $\delta$ is an indicator function that returns 1 if the condition of ($o_{ik}=o_{jk}$) is true (i.e., if the execution outputs $o_{ik}$ are identical to the execution outputs $o_{jk}$) and returns 0 otherwise.

In some implementations, the method further includes receiving a new input; selecting a code solution from a cluster having the highest score among the plurality of clusters; and executing the source code in the selected code solution on the new input to perform the task.

Other innovative aspects of the subject matter described in this specification can be embodied in one or more systems and one or more non-transitory storage media encoded with instructions that when implemented by one or more computers cause the one or more computers to implement the system and method described above.

The subject matter described in this specification can be implemented in particular embodiments so as to realize one or more of the following technical advantages.

Code sequences generated by large language models are often prone to errors, especially when likelihood-based decoding techniques, such as greedy search or beam search, are employed. Alternatively, code sequences can be generated by using sampling-based decoding techniques which extract multiple solutions from the language model's multinomial distribution. Sampling-based decoding techniques could generate a wide range of code solutions which could be correct or not correct. As a result, there is a need of effective ranking strategies for code generation with the goal of sorting through an abundance of code solutions to identify high-quality and accurate ones.

The subject matter described in this specification is directed to techniques for ranking code solutions generated by large language models in order to organize a set of candidate programs so that accurate programs are prioritized and used for executing a task. Existing methods rank individual code solutions, or cluster code solutions based on their functionality and then use cluster-specific data to determine ranking scores. Methods that rank individual code solutions often overlook functional correctness by not verifying test cases, which prevents them from identifying accurate code solutions. More specifically, verifying whether execution outputs of a generated code match expected outputs of test cases is crucial to make sure that the generated code is correct. Thus, the lack of this step can result in a decline in performance of the overall system and in quality of the generated code. In addition, given that language models frequently produce code solutions that differ syntactically but are semantically analogous, methods that cluster solutions based on functionality often narrow the candidate pool and therefore may omit important candidates. Further, by treating clusters in isolation, these methods fail to model potential informative and functional similarities and interactions among clusters. In addition, existing methods that group code solutions into clusters assume that the correct cluster is the largest one. However, this approach disregards other aspects such as verification of execution outputs. Thus, there is no guarantee that the largest cluster contains the correct code solution.

To address the drawbacks of existing systems, the claimed subject matter provides techniques for ranking code solutions by modeling inter-cluster relationships among clusters of code solutions. Specifically, the techniques employ a new metric called functional overlap to quantify the similarity between clusters of code solutions based on the execution outputs of code solutions. This allows for identifying the most representative cluster that exhibits maximal overlap with all other clusters. As inconsistencies often indicate incorrect functionality, the cluster interacting most comprehensively likely represents the optimal code solution. By incorporating these inter-cluster relationships into the ranking pipeline, the techniques described in this specification can better identify the most accurate code solutions. Therefore, systems that employ the described techniques have significant technical improvements over existing systems used for generating and executing source code to perform a task, as they can output source code with higher accuracy, thereby improving performance on the task when the accurate source code is executed.

More particular, the described techniques would ensure that the generated code meets performance standards, identifying solutions that are not only syntactically correct but also optimized for speed, memory usage, and scalability of computing systems. This is particularly important in computing systems where performance constraints are critical, such as real-time applications, large-scale data processing, or embedded systems.

In addition, by automatically and effectively determining and prioritizing high-quality code that meets the required functionality, the described ranking techniques would allow computing systems to significantly reduce both running time and computational resources needed during the code generation and execution processes. Without the described ranking techniques, language models may generate numerous suboptimal or incorrect code sequences, requiring substantial human review and manual correction. This not only increases the time spent debugging or rewriting code but also adds to the overall computational overhead, as systems may need to execute multiple iterations of generation and evaluation to find a functional solution.

The described code solution ranking techniques, however, would streamline this process by identifying the most suitable and efficient code early on. The described techniques allow systems to be computationally efficient by effectively identifying high-quality code solutions even with a limited number of test inputs, thereby reducing the amount of computer resources needed to run code candidates on a large number of test inputs. More specifically, systems that implement the described techniques require fewer sequences to be sampled for both code solutions and test cases compared to existing code ranking systems, while still achieving the same level of (or better) performance. The computational cost for executing a limited number of solutions (e.g., 20, 25 or 30 solutions) against a limited number of test cases (e.g., 20, 25, or 30 test cases) is significantly lower than running all possible test cases (e.g., 50, 80 or 100 test cases). This computational cost saving capability of the described systems is highly applicable in real-world practices, making the described code solution ranking techniques ideal for real-time systems where balancing between effectiveness and efficiency is crucial.

With the ability to capture intricate interactions between clusters, the described techniques have improved performance (in terms of, e.g., accuracy of code solutions) over existing isolated ranking techniques. Further, instead of repeating compilations, debugging and performance optimizations for a large number of code solutions, the described techniques allow a computing system to focus its resources on only high-ranking code solutions that are more likely to be correct and optimized. This prioritization would minimize unnecessary execution of flawed code, leading to faster development and execution cycles and more efficient use of computational power, particularly in large-scale or resource-constrained environments. Moreover, by favoring code solutions that are not only functionally correct but also optimized in terms of performance-such as those that use fewer computational cycles or lower memory overhead-computing systems that employ the described techniques can achieve better performance outcomes with reduced hardware demands in compared to traditional systems. This can be especially beneficial in cloud computing, embedded systems, or mobile platforms where computational efficiency directly translates into computational cost savings and extended device longevity. Therefore, the subject matter described in this specification would contribute to more agile, scalable, and cost-effective and faster development processes across a wide range of computing devices and applications.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that is configured to automatically generating and ranking different sets of source code (also referred to as "code solutions").

Source code is a set of human-readable instructions or statements written in a programming language to instruct a computer or software system on how to perform a specific task or function. These instructions are written using tokens, symbols, and structures that programmers can comprehend and work with to create software applications.

Source code serves as the original, high-level representation of a computer program. Source code must be translated into machine-readable instructions through a process called compilation or interpretation, depending on the programming language. Once translated, the resulting machine code can be executed by a computer's CPU.

Source code is essential for software development, debugging, maintenance, and collaboration among developers, as it provides a structured and understandable representation of the logic and behavior of a software application or system.

Figure 1:
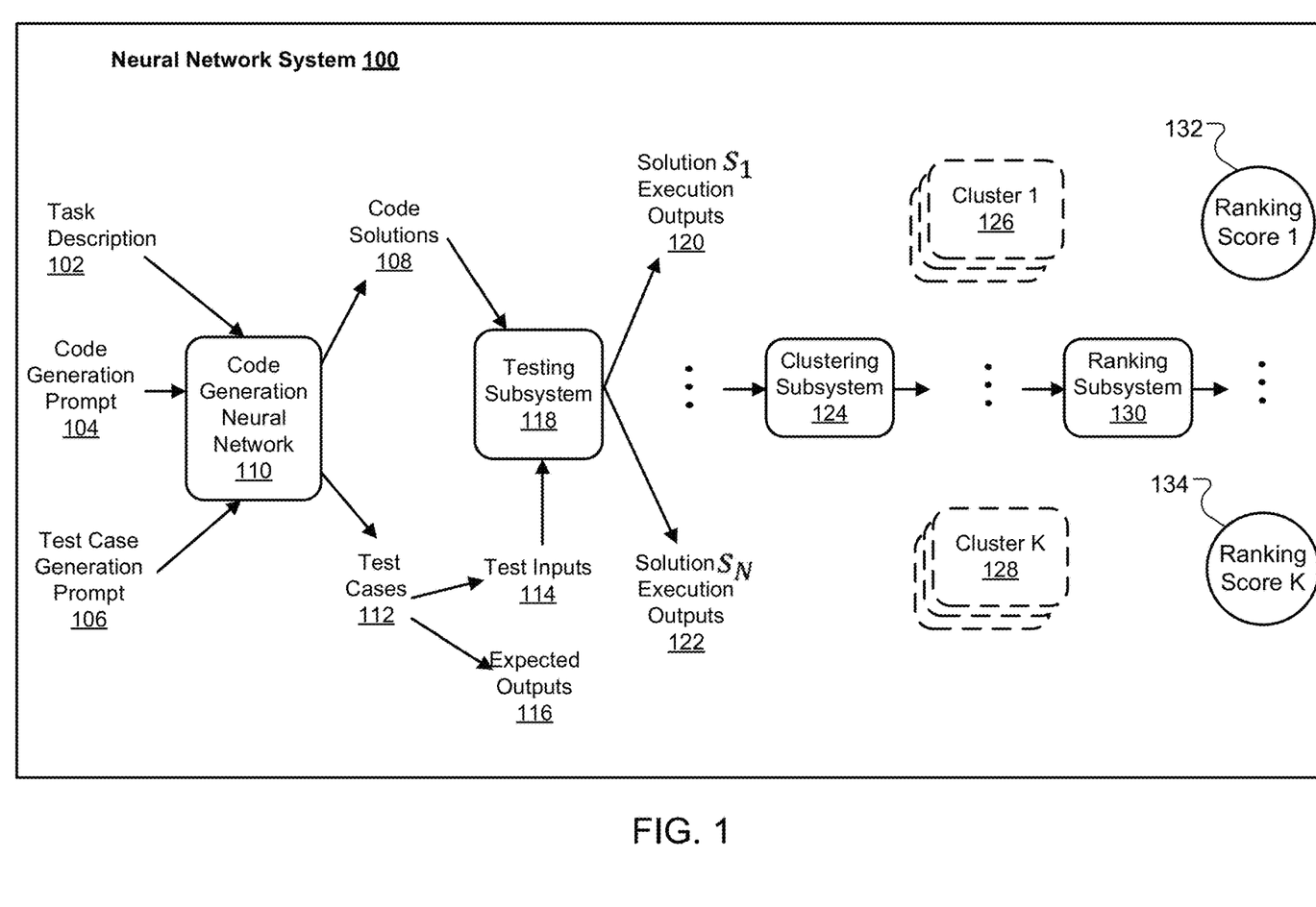
FIG. 1 shows an example neural network system for generating and ranking code solutions.

FIG. 1 shows an example neural network system 100 for generating and ranking code solutions. The system 100 is an example of a system implemented as computer programs on one or more computers in one or more locations, in which the systems, components, and techniques described below can be implemented. The neural network system 100 includes a code generation neural network 110, a testing subsystem 118, a clustering subsystem 124, and a ranking subsystem 130.

Each of the code generation neural network 110, the testing subsystem 118, the clustering subsystem 124, and the ranking subsystem 130 is implemented as one or more software modules or components, installed on one or more computers in one or more locations.

Generally, the code generation neural network 110 is a neural network that includes a plurality of artificial neurons. These artificial neurons are arranged into a plurality of layers: an input layer, one or more hidden layers, and an output layer. Each neuron processes inputs from other neurons, applying weighted connections to determine the strength of influence from each input. The "weights" of these connections are adjusted during training, enabling the model to learn patterns in large datasets of source code and natural language prompts. As input data, such as a task description and code generation prompt, propagates through the network, each layer of neurons applies an activation function to transform the information, allowing the model to generate accurate and contextually relevant code. By leveraging this structure, the code generation neural network can not only generate source code solutions but also produce corresponding test cases to automatically test and rank code solutions to determine the optimal solution without human intervention.

In particular, in some implementations, the code generation neural network 110 is a code large language model that includes multiple neural network layers, including an embedding layer, a series of Transformer blocks, and a final output layer. Each of the Transformer blocks includes multiple attention neural network layers configured to perform attention mechanisms, multiple feed-forward neural network layers, and multiple normalization neural network layers. The embedding layer takes input tokens from input data (including input sequences including a task description, a code generation prompt and a test case generation prompt) and converts the input tokens into vector representations that the code large language model can process. These vectors are then passed through the series of Transformer blocks, where each block processes the vector representations through self-attention mechanisms of attention neural network layers, helping the code large language model to understand relationships between tokens regardless of their distance in the input sequences. The output from each attention layer is then passed through a feed-forward neural network layer, and other neural network layers such as a layer normalization layer that further refines the vector representations.

The attention mechanism in each layer allows the model to focus on different parts of the input when predicting the next token or output. The feed-forward network increases the representational power of the model by learning non-linear transformations. Layer normalization helps stabilize training and improve the gradient flow. The output of these Transformer blocks is processed by the final output layer to generate predictions, such as the next token in a code sequence or a test case. This architecture enables the code large language model to effectively model complex patterns in code and natural language, supporting tasks such as code completion, synthesis, and understanding.

The code generation neural network 110 has been trained on training data to receive input data including (i) a task description describing a task (e.g., a programming task); (ii) a code generation prompt that instructs the code generation neural network 110 to generate source code for performing the task, and (iii) a test case generation prompt that instructs the code generation neural network 110 to generate a set of test cases for testing the source code generated by the code generation neural network 110, and to process the input data to generate a plurality of code solutions and a plurality of test cases. The task description is a problem statement that specifies a particular computer task that needs to be solved by a computer program and requires an implementation of a function that adheres to specific requirements (e.g., adheres to test cases).

For example, a task description that describes a programming task to check if in a given list of numbers there are any two numbers closer to each other than a given threshold is as follows:

from typing import List def has_close_elements(numbers: List[float], threshold: float)→bool: """Check if in given list of numbers, are any two numbers closer to each other than given threshold.

>>>has_close_elements([1.0, 2.0, 3.0], 0.5) False

>>>has_close_elements([1.0, 2.8, 3.0, 4.0, 5.0, 2.0], 0.3) True""""

This example includes the function signature, the docstrings and examples of test cases. The last two lines of the example above are examples of test cases.

Each of the plurality of code solutions includes comprising a respective set of candidate source code for performing the task.

As shown in FIG. 1, after training, the trained code generation neural network 110 is configured to receive input data including (i) a task description 102 describing a task, (ii) a code generation prompt 104 that instructs the trained code generation neural network 110 to generate source code for performing the task, and (iii) a test case generation prompt 106 that instructs the trained code generation neural network 110 to generate a set of test cases for testing the source code generated by the trained code generation neural network 110. An example of a task description 102 is as follows:

from typing import List, Tuple
def sum_product(numbers: List[int])→Tuple[int, int]:
"""For a given list of integers, return a tuple consisting of a sum and a product of all the integers in a list. Empty sum should be equal to 0 and empty product should be equal to 1."""

Figure 2:
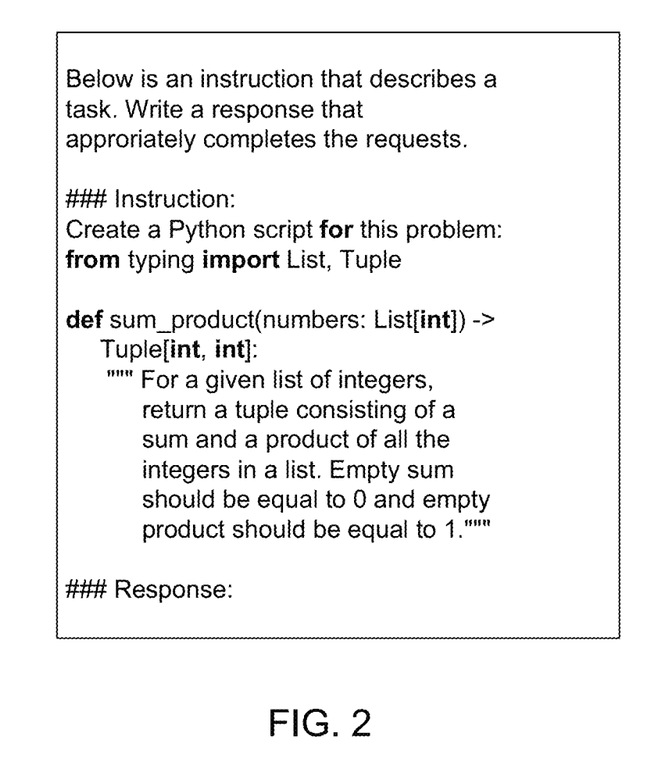
FIG. 2 illustrates an example of a code generation prompt.
Figure 3:
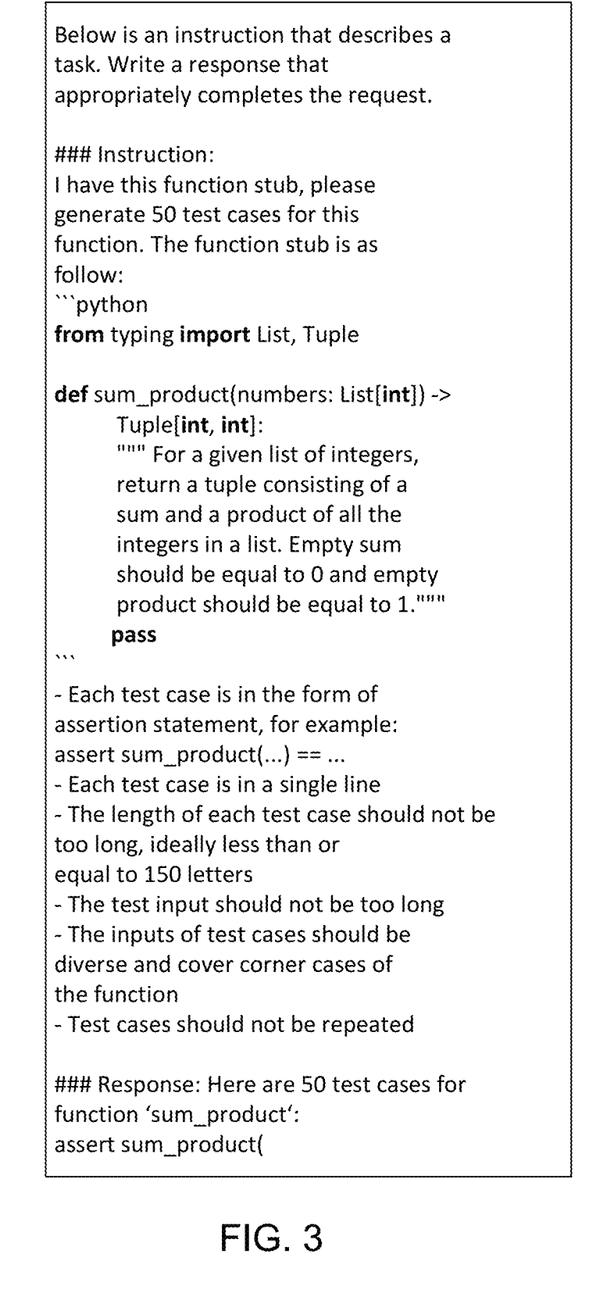
FIG. 3 illustrates an example of a test case generation prompt.
Figure 4:
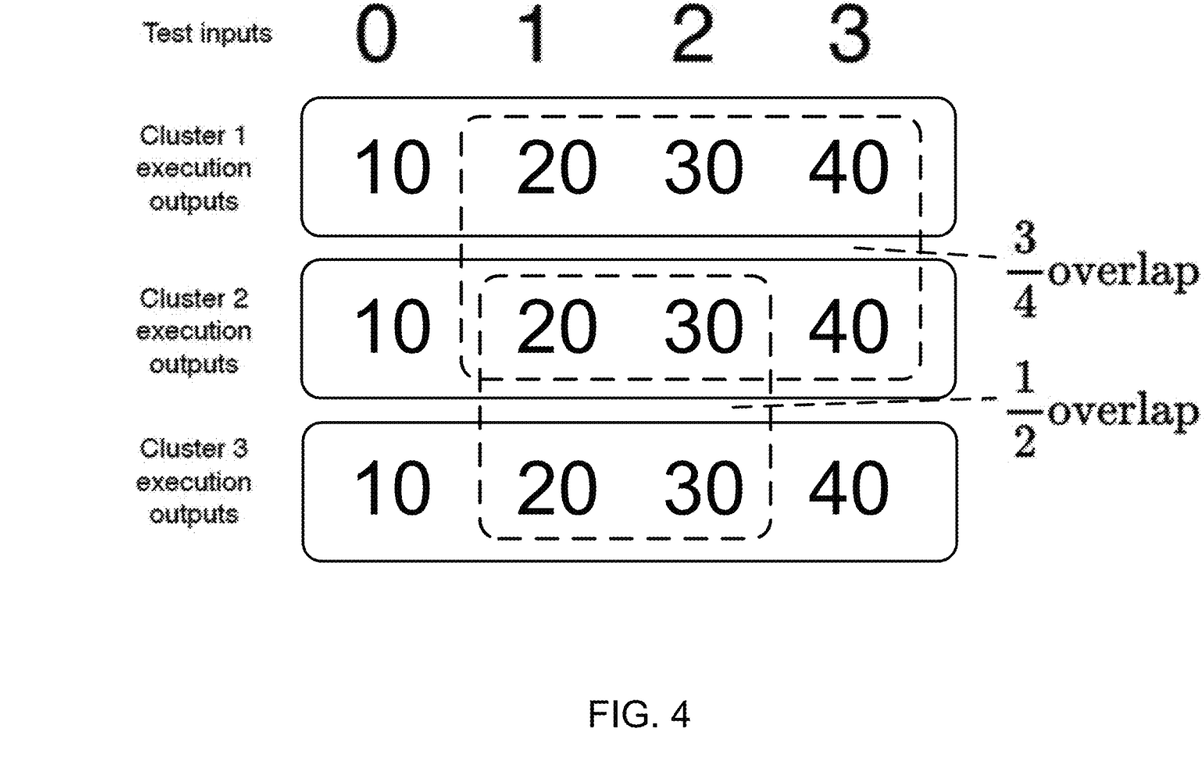
FIG. 4 is an example illustrating the functional overlap among clusters of code solutions.

An example of a code generation prompt is shown in FIG. 2 and an example of a test case generation prompt is shown in FIG. 3.

The code generation neural network 110 is configured to process the input data to generate a plurality of code solutions 108 and a plurality of test cases 112. The plurality of code solutions 108 can be denoted as $S=\{s_1, s_2, \ldots, s_N\}$ where N denotes the number of code solutions. Each of the plurality of code solutions includes a respective set of candidate source code that, when being compiled and executed, can perform the task described in the task description. The plurality of test cases 112 can be denoted as $T=\{t_1, t_2, \ldots, t_M\}$ where M denotes the number of test cases.

Each test case $t_i$ includes two components: the test input 114 (denoted as $z_i$) and the expected output 116 (denoted as $ô_i$) based on a context (e.g., assert add (1,2)==3, where (1,2) is the text input and 3 is the expected output).

For each code solution $s_i$ in the plurality of code solutions $S=\{s_1, s_2, \ldots, s_N\}$ (108), the testing subsystem 118 is configured to execute the code solution $s_i$ on each test input $z_i$ in the set of test inputs $Z=\{z_1, z_2, \ldots, z_M\}$ to generate a plurality of execution outputs $\{o_{i1}, o_{i2}, \ldots, o_{iM}\}$ for the code solution $z_i$. For example, the testing subsystem 118 is configured to execute the code solution $s_1$ to generate execution outputs 120 (denoted as $\{o_{11}, o_{12}, \ldots, o_{1M}\}$), execute the code solution $s_2$ to generate execution outputs denoted as $\{o_{21}, o_{22}, \ldots, o_{2M}\}$ (not shown), . . . , and execute the code solution $s_N$ to generate the execution outputs 122 (denoted as $\{o_{N1}, o_{N2}, \ldots, o_{NM}\}$). The set of all execution outputs generated by executing all code solutions S (108) on all test inputs is denoted as $O=\{o_{11}, o_{12}, \ldots, o_{NM}\}$.

The clustering subsystem 124 is configured to cluster (i.e., group) the plurality of code solutions 108 into a plurality of clusters $C=\{C_1, C_2, \ldots, C_K\}$ (e.g., clusters 126, . . . , 128 on FIG. 1) based on their execution outputs O, where K is the number of unique clusters.

More particularly, as described above, the testing subsystem 118 executes each code solution $s_i \in S$ on the test inputs Z to produce execution outputs O. The testing subsystem 119 then groups code solutions that exhibit identical execution outputs into the same cluster: $F(s_i)=F(s_j) \Leftrightarrow Os_i=Os_j$. F represents a clustering function that maps a code solution s to a cluster identifier k. The above equation indicates that two solutions $s_i$ and $s_j$ are assigned to the same cluster if and only if their respective set of execution outputs $Os_i$ and $Os_j$ are exactly equal. If a code solution does not have execution outputs identical to execution outputs of any other code solution, the code solution is assigned to a single-solution cluster (i.e., a cluster that has only one code solution). All clusters are treated equally.

The ranking subsystem 130 is configured to compute an interaction matrix I to quantify the functional overlap between the plurality of clusters.

In particular, after obtaining execution output $o_{ij}$ for each cluster $C_i$ on test input $z_j$, the ranking subsystem 130 determines an interaction matrix $I \in \mathbb{R}^{K \times K}$ to quantify functional overlap between clusters as follows:

$$I_{ij} = \frac{1}{M}\sum_{k=1}^{M} \delta(o_{ik} = o_{jk}),$$

where $o_{ik}$ and $o_{jk}$ refer directly to the execution outputs of clusters $C_i$ and $C_j$ respectively on the $k^{th}$ test input. $\delta$ is an indicator function that returns 1 if the condition inside is true and 0 otherwise.

The ranking subsystem 130 is configured to multiply the interaction matrix I by a validation score vector $V \in \mathbb{R}^{K \times 1}$ to obtain final ranking vector $R \in \mathbb{R}^{K \times 1}$ that includes a ranking score for each cluster (e.g., ranking scores 132, . . . , 134 for clusters 126, . . . , 128, respectively). The validation scores in the validation score vector V represent features of each cluster. For instance, a validation score $V_i$ could represent the number of code solutions in cluster $C_i$ (abbreviated as cluster sizes) or the number of test cases that the code solutions in cluster $C_i$ passed (abbreviated as pass rates), providing a notion of cluster confidence. A test case is considered "passed" if its expected outputs match the corresponding execution outputs of the code solutions in cluster $C_i$.

The ranking subsystem 130 computes the final ranking vector $R \in \mathbb{R}^{K \times 1}$ as R=I.V. Here, each ranking score $R_i$ in the final ranking vector aggregates information about both the inter-cluster interactions of cluster $C_i$ (via the interaction matrix I) and its cluster features (via V). The ranking subsystem 130 ranks the clusters according to their ranking scores (e.g., in an ascending or descending order). Clusters with higher ranking scores in R are those with significant functional overlap to other clusters and high validity according to V. By considering inter-cluster relationships and functional similarity in a principled manner as described above, the ranking subsystems 130 can effectively identify the most promising cluster having the most accurate code solutions for performing the task.

After determining the scores for all clusters and ranking them, the system returns code solutions from the cluster with the highest score (or from one or more clusters with the highest scores). In some implementations, the system automatically selects (e.g., randomly select) and returns a code solution from the cluster having the highest score (or from one or more clusters with the highest scores).

In some implementations, the system executes the selected code solution on one or more new inputs to perform the task.

In some other implementations, the system transmits the selected code solution to another system for further processing, or for executing the code solution on a new input to perform the task.

In some other implementations, the system presents the selected code solution on a user interface and prompts a user to accept the code solution. Upon acceptance, the process reduces the user's effort and enhances productivity.

Although FIG. 1 illustrates one code generation neural network, the neural network system 100 may include multiple code generation neural networks. The neural network system 100 may train multiple code generation neural networks to process a task description, a code generation prompt, and a test case generation prompt to generate code solutions and test cases. During inference, the neural network system 100 may provide input data to multiple trained code generation neural networks and use these trained code generation neural networks process the input data to generate code solutions and test cases.

FIG. 2 illustrates the concept of "functional overlap" among clusters of code solutions. Cluster 1's execution outputs are [10,20,30,40]. Cluster 2's execution outputs are [11,20,30,40]. Cluster 3's execution outputs are [10,20,30,40]. As a result, Cluster 1 overlaps Cluster 2 on three values [20,30,40], indicating that they are ¾ overlapped. Cluster 1 overlaps Cluster 3 on three values [10,20,30], which can also be considered ¾ overlapped. Cluster 1 has a functional overlapping score of 3+3=6. Cluster 2 overlaps with Cluster 3 on two values [20,30], resulting in a functional overlapping score of 2+3=5, and Cluster 3 has a functional overlapping score of 5. Thus, Cluster 1 has the highest cumulative functional overlap, is most representative and likely include the optimal code solution.

Figure 5:
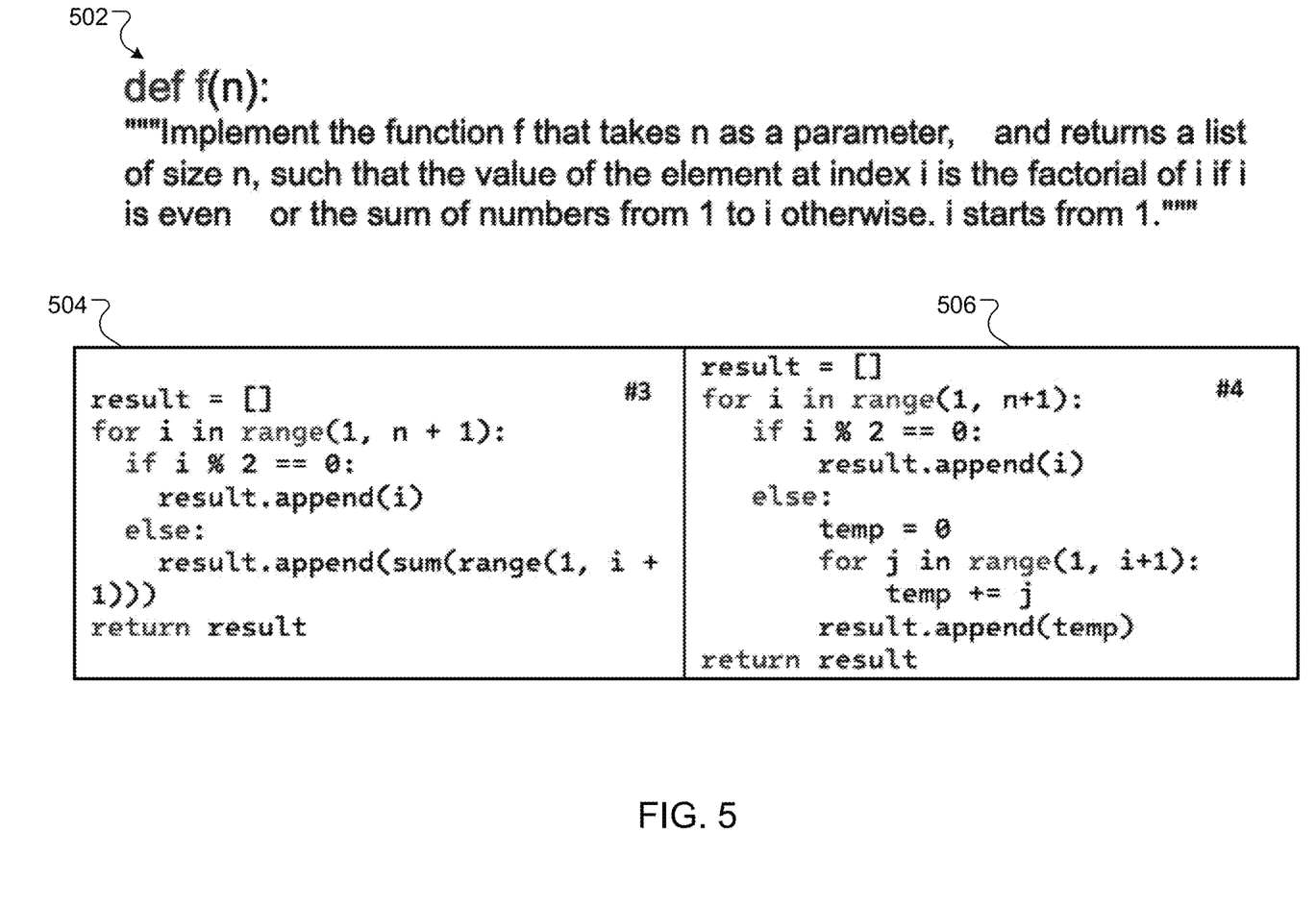
FIG. 5 illustrates examples of code solutions.

FIG. 5 illustrates an example of a task description 502 and a cluster that includes two code solutions 504 and 506 for performing the task. The cluster is one of the clusters having the highest ranking scores.

Figure 6:
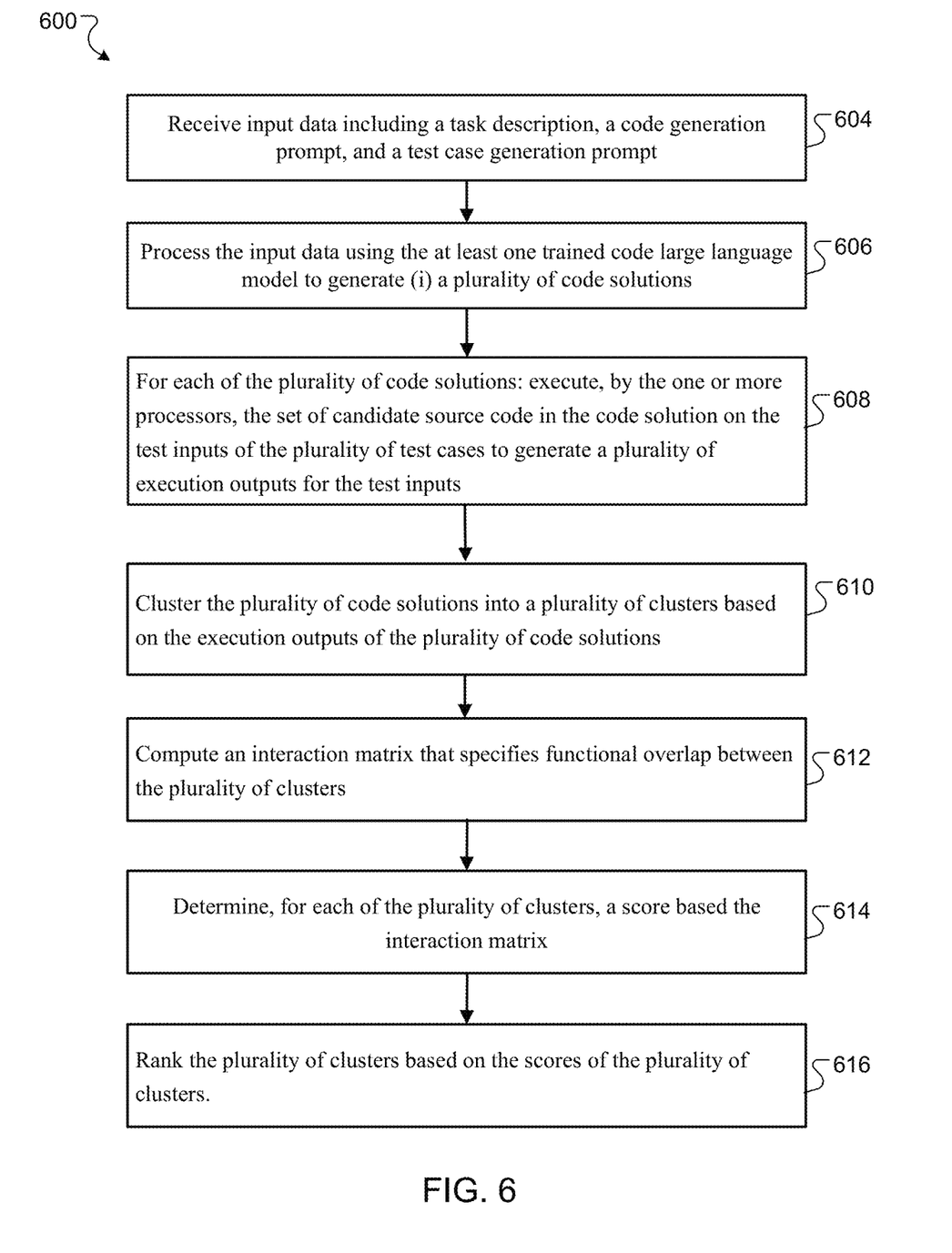
FIG. 6 is a flow diagram of an example process for generating and ranking code solutions.

FIG. 6 is a flow diagram of an example process for generating and ranking code solutions for performing a task. For convenience, the process 600 will be described as being performed by a system of one or more computers located in one or more locations. For example, a neural network system, e.g., the neural network system 100 of FIG. 1, appropriately programmed in accordance with this specification, can perform the process 600.

The system receives input data (step 604). The input data includes (i) a task description describing a task, (ii) a code generation prompt that instructs the at least one trained code generation neural network to generate source code for performing the task, and (iii) a test case generation prompt that instructs the at least one trained code generation neural network to generate a set of test cases for testing the source code generated by the at least one trained code generation neural network.

The system processes the input data using at least one trained code generation neural network to generate a plurality of code solutions and a plurality of test cases (step 606). Each of the plurality of code solutions includes a respective set of candidate source code for performing the task. Each of the plurality of test cases comprises a test input and an expected output for the test input.

For each of the plurality of code solutions, the system executes the set of candidate source code in the code solution on the test inputs of the plurality of test cases to generate a plurality of execution outputs for the test inputs (step 608).

The system clusters the plurality of code solutions into a plurality of clusters based on the execution outputs of the plurality of code solutions (step 610). In some implementations, the system clusters the plurality of code solutions by grouping code solutions that have identical execution outputs into a same cluster.

The system computes, by the one or more processors, an interaction matrix that specifies functional overlap between the plurality of clusters (step 612). In some implementations, the interaction matrix is denoted as $I \in \mathbb{R}^{K \times K}$, where K is the number of clusters in the plurality of clusters, wherein each element in the interaction matrix is computed as follows:

$$I_{ij} = \frac{1}{M}\sum_{k=1}^{M}\delta(o_{ik} = o_{jk}),$$

where $I_{ij}$ represents functional overlap between cluster $C_i$ and cluster $C_j$, $o_{ik}$ and $o_{jk}$ are execution outputs of cluster $C_i$ and cluster $C_j$ respectively on the $k^{th}$ test input. $\delta$ is an indicator function that returns 1 if the condition of ($o_{ik}=o_{jk}$) is true (i.e., if the execution outputs $o_{ik}$ are identical to the execution outputs $o_{jk}$) and returns 0 otherwise.

The system determines, for each of the plurality of clusters, a score based the interaction matrix (step 614). In some implementations, the system multiplies the interaction matrix by a validation score vector to obtain a ranking score vector that comprises a score for each of the plurality of clusters. In some implementations, the validation score vector represents, for each of the plurality of clusters, a feature of the cluster. For example, the feature may be a number of code solutions in the cluster. As another example, the feature may be a number of test cases that the code solutions in the cluster have passed.

The system ranks the plurality of clusters based on the scores of the plurality of clusters (step 616).

In some implementations, the system receives a new input. The system selects a code solution from a cluster having the highest score among the plurality of clusters. The system executes the source code in the selected code solution on the new input to perform the task.

The code generation neural network has been trained through multiple stages, including data preparation, model training, and fine-tuning, with the objective of enabling the neural network to generate both source code solutions and test cases based on task descriptions and prompts. The code generation neural network can be, for example, a code large language model.

The training process begins by collecting a large dataset comprising various types of code and associated task descriptions, code generation prompts, and test cases from publicly available code repositories, developer forums, and documentation sources. The dataset includes diverse programming languages, code snippets, function definitions, algorithms, and problem-solving exercises, along with corresponding test cases. The task descriptions in the dataset define specific programming tasks, while the code generation prompts guide the model on how to generate source code for solving these tasks. In addition, the dataset includes test case generation prompts that direct the model to generate corresponding test cases, which contain both test inputs and expected outputs.

The collected dataset is preprocessed to convert source code, task descriptions, code generation prompts, and test case generation prompts into a structured format suitable for training a transformer-based model. The training model is built using a multi-layer transformer architecture, which is commonly used in large language models. The model is trained to predict the next token in a sequence, given a preceding context of tokens, allowing it to generate coherent source code and test cases from task descriptions and prompts.

The training objective is to minimize prediction errors, ensuring that the model learns to associate task descriptions and prompts with appropriate source code and test cases. During training, the model is exposed to input data comprising (i) task descriptions that describe programming tasks, (ii) code generation prompts that instruct the model to generate code, and (iii) test case generation prompts that instruct the model to create test cases for evaluating the code solutions. The model generates candidate source code solutions and corresponding test cases by learning from examples in the training data.

The model is trained to predict the next token in a sequence based on the preceding tokens, enabling it to generate code incrementally. During training, the model learns to map task descriptions to code examples by being exposed to a wide variety of coding tasks (e.g., "Write a function to calculate the factorial of a number") and their corresponding outputs, thereby identifying patterns and structures that govern code generation. The training process is guided by an objective function, typically cross-entropy loss, which measures the discrepancy between the model's predicted output and the actual target output.

To minimize this loss, the model uses backpropagation and gradient descent. Backpropagation is the technique used to calculate the gradient of the loss function with respect to the model's current weights (i.e., current values of parameters of the code generation neural network), effectively identifying how much each weight contributes to the prediction error (i.e., the loss that measures the discrepancy between the model's predicted output and the actual target output).

The calculated gradients are then used in gradient descent, an optimization algorithm that adjusts the model's weights incrementally to minimize the loss. In gradient descent, the current values of the parameters of the code generation neural network are updated by moving in the direction of the negative gradient, allowing the model to gradually learn the optimal set of parameter values that improve its predictions over time. This iterative process ensures that the model becomes increasingly accurate at generating source code from task descriptions and prompts as training progresses.

After initial training, the code generation neural network undergoes fine-tuning to improve its performance. Fine-tuning involves training the model on a smaller, more focused dataset that includes both general and domain-specific code examples and test cases, as well as prompt-based tasks. The fine-tuning process ensures that the model can generate not only syntactically correct and efficient source code but also robust test cases capable of validating the generated code.

Once training is complete, the code generation neural network has a set of trained values of the parameters and can receive input data that includes (i) a task description describing a task, (ii) a code generation prompt that instructs the model to generate source code for performing the task, and (iii) a test case generation prompt that instructs the model to generate a set of test cases for testing the generated source code. The code generation neural network is configured to process the input data using the trained values of the parameters to generate an output of the trained model. The output includes (i) a plurality of code solutions, each comprising a respective set of candidate source code for performing the task, and (ii) a plurality of test cases, each comprising a test input and an expected output for the test input, to evaluate the correctness of the generated code solutions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for generating and ranking code solutions for performing a task, the method comprising:
  receiving, by one or more processors, input data comprising: (i) a task description describing a task, (ii) a code generation prompt that instructs at least one trained code generation neural network to generate source code for performing the task, and (iii) a test case generation prompt that instructs the at least one trained code generation neural network to generate a set of test cases for testing the source code generated by the at least one trained code generation neural network, wherein the at least one trained code generation neural network comprises a plurality of artificial neurons arranged into a plurality of neural network layers;

processing the input data using the at least one trained code generation neural network to generate (i) a plurality of code solutions, each of the plurality of code solutions comprising a respective set of candidate source code for performing the task, and (ii) a plurality of test cases for testing the plurality of code solutions, wherein each of the plurality of test cases comprises a test input and an expected output for the test input;

for each of the plurality of code solutions:
executing, by the one or more processors, the set of candidate source code in the code solution on the test inputs of the plurality of test cases to generate a plurality of execution outputs for the test inputs;

clustering, by the one or more processors, the plurality of code solutions into a plurality of clusters based on the execution outputs of the plurality of code solutions;

computing, by the one or more processors, an interaction matrix that specifies functional overlap between the plurality of clusters;

determining, for each of the plurality of clusters, a score based the interaction matrix;

ranking the plurality of clusters based on the scores of the plurality of clusters; and returning a generated code solution from a cluster of the plurality of clusters that has a highest score.

2. The computer-implemented method of claim 1, wherein clustering, by the one or more processors, the plurality of code solutions into the plurality of clusters based on the execution outputs of the plurality of code solutions comprises:
grouping code solutions that have identical execution outputs into a same cluster.

3. The computer-implemented method of claim 1, wherein determining, for each of the plurality of clusters, a score based the interaction matrix comprises:
multiplying the interaction matrix by a validation score vector to obtain a ranking score vector that comprises a score for each of the plurality of clusters.

4. The computer-implemented method of claim 3, wherein the validation score vector represents, for each of the plurality of clusters, a feature of the cluster.

5. The computer-implemented method of claim 4, wherein the feature is a number of code solutions in the cluster, or
wherein the feature is a number of test cases that the code solutions in the cluster have passed.

6. The computer-implemented method of claim 1, wherein the interaction matrix is denoted as $I \in \mathbb{R}^{K \times K}$, where K is a number of clusters in the plurality of clusters, wherein each element in the interaction matrix is computed as follows:

$$I_{ij} = \frac{1}{M} \sum_{k=1}^{M} \delta(o_{ik} = o_{jk}),$$

where $I_{ij}$ represents functional overlap between cluster $C_i$ and cluster $C_j$, $o_{ik}$ and $o_{jk}$ are execution outputs of cluster $C_i$ and cluster $C_j$ respectively on a $k^{th}$ test input, $\delta$ is an indicator function that returns 1 if the execution outputs $o_{ik}$ are identical to the execution outputs $o_{jk}$ and returns 0 otherwise, and M is the number of test cases in the set of test cases.

7. The computer-implemented method of claim 1, further comprising:
receiving a new input;
selecting a code solution from a cluster having the highest score among the plurality of clusters; and
executing the source code in the selected code solution on the new input to perform the task.

8. A neural network system for generating and ranking source code, the neural network system comprising one or more computers and one or more non-transitory computer storage media storing instructions that, when executed by the one or more computers, cause the one or more computers to perform operations comprising:
receiving input data comprising (i) a task description describing a task, (ii) a code generation prompt that instructs at least one trained code generation neural network to generate source code for performing the task, and (iii) a test case generation prompt that instructs the code generation neural network to generate a set of test cases for testing the source code generated by the at least one trained code generation neural network, wherein the at least one trained code generation neural network comprises a plurality of artificial neurons arranged into a plurality of neural network layers;

processing the input data using the at least one trained code generation neural network to generate (i) a plurality of code solutions, each of the plurality of code solutions comprising a respective set of candidate source code for performing the task, and (ii) a plurality of test cases for testing the plurality of code solutions, wherein each of the plurality of test cases comprises a test input and an expected output for the test input;

for each of the plurality of code solutions, executing the set of candidate source code in the code solution on the test inputs of the plurality of test cases to generate a plurality of execution outputs for the test inputs;

clustering the plurality of code solutions into a plurality of clusters based on the execution outputs of the plurality of code solutions;

computing an interaction matrix that specifies functional overlap between the plurality of clusters;

determining, for each of the plurality of clusters, a score based the interaction matrix;

ranking the plurality of clusters based on the scores of the plurality of clusters; and returning a generated code solution from a cluster of the plurality of clusters that has a highest score.

9. The neural network system of claim 8, wherein clustering the plurality of code solutions into the plurality of clusters based on the execution outputs of the plurality of code solutions comprises:
grouping code solutions that have identical execution outputs into a same cluster.

10. The neural network system of claim 8, wherein determining, for each of the plurality of clusters, a score based the interaction matrix comprises:
multiplying the interaction matrix by a validation score vector to obtain a ranking score vector that comprises a score for each of the plurality of clusters.

17

11. The neural network system of claim 10, wherein the validation score vector represents, for each of the plurality of clusters, a feature of the cluster.

12. The neural network system of claim 11, wherein the feature is a number of code solutions in the cluster.

13. The neural network system of claim 11, wherein the feature is a number of test cases that the code solutions in the cluster passed.

14. The neural network system of claim 8, wherein the interaction matrix is denoted as $I \in \mathbb{R}^{K \times K}$, where K is a number of clusters in the plurality of clusters, wherein each element in the interaction matrix is computed as follows:

$$I_{ij} = \frac{1}{M} \sum_{k=1}^{M} \delta(o_{ik} = o_{jk}),$$

where $I_{ij}$ represents functional overlap between cluster $C_i$ and cluster $C_j$, $o_{ik}$ and $o_{jk}$ are execution outputs of cluster $C_i$ and cluster $C_j$ respectively on a kfth test input, $\delta$ is an indicator function that returns 1 if the execution outputs $o_{ik}$ are identical to the execution outputs $o_{jk}$ and returns 0 otherwise, and M is the number of test cases in the set of test cases.

15. One or more non-transitory computer storage media storing instructions that, when executed by one or more computers, cause the one or more computers to perform operations for generating and ranking code solutions, the operations comprising:
receiving input data, wherein the input data comprises (i) a task description describing a task, (ii) a code generation prompt that instructs at least one trained code generation neural network to generate source code for performing the task, and (iii) a test case generation prompt that instructs the at least one trained code generation neural network to generate a set of test cases for testing the source code generated by the trained code generation neural network, wherein the at least one trained code generation neural network comprises a plurality of artificial neurons arranged into a plurality of neural network layers;
processing the input data using the at least one trained code generation neural network to generate (i) a plurality of code solutions, each of the plurality of code solutions comprising a respective set of candidate source code for performing the task, and (ii) a plurality of test cases for testing the plurality of code solutions, wherein each of the plurality of test cases comprises a test input and an expected output for the test input;
for each of the plurality of code solutions:
executing the set of candidate source code in the code solution on the test inputs of the plurality of test cases to generate a plurality of execution outputs for the test inputs;

18 clustering the plurality of code solutions into a plurality of clusters based on the execution outputs of the plurality of code solutions;
computing an interaction matrix that specifies functional overlap between the plurality of clusters;
determining, for each of the plurality of clusters, a score based the interaction matrix;
ranking the plurality of clusters based on the scores of the plurality of clusters; and
returning a generated code solution from a cluster of the plurality of clusters that has a highest score.

16. The one or more non-transitory computer storage media of claim 15, wherein the operations for clustering, by the one or more processors, the plurality of code solutions into the plurality of clusters based on the execution outputs of the plurality of code solutions comprises:
grouping code solutions that have identical execution outputs into a same cluster.

17. The one or more non-transitory computer storage media of claim 15, wherein the operations for determining, for each of the plurality of clusters, a score based the interaction matrix comprises:
multiplying the interaction matrix by a validation score vector to obtain a ranking score vector that comprises a score for each of the plurality of clusters.

18. The one or more non-transitory computer storage media of claim 17, wherein the validation score vector represents, for each of the plurality of clusters, a feature of the cluster.

19. The one or more non-transitory computer storage media of claim 18, wherein the feature is a number of code solutions in the cluster, or wherein the feature is a number of test cases that the code solutions in the cluster passed.

20. The one or more non-transitory computer storage media of claim 15, wherein the interaction matrix is denoted as $\in \mathbb{R}^{K \times K}$, where K is the number of clusters in the plurality of clusters, wherein each element in the interaction matrix is computed as follows:

$$I_{ij} = \frac{1}{M} \sum_{k=1}^{M} \delta(o_{ik} = o_{jk}),$$

where $I_{ij}$ represents functional overlap between cluster $C_i$ and cluster $C_j$, $o_{ik}$ and $o_{jk}$ are execution outputs of cluster $C_i$ and cluster $C_j$ respectively on the $k^{th}$ test input, $\delta$ is an indicator function that returns 1 if the execution outputs $o_{ik}$ are identical to the execution outputs $o_{jk}$ and returns 0 otherwise, and M is the number of test cases in the set of test cases.

* * * * *